(12) United States Patent
Decker

(10) Patent No.: US 6,430,305 B1
(45) Date of Patent: *Aug. 6, 2002

(54) IDENTITY VERIFICATION METHODS

(75) Inventor: Joseph E. Decker, San Jose, CA (US)

(73) Assignee: Synaptics, Incorporated, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,707

(22) Filed: Dec. 20, 1996

(51) Int. Cl.$^7$ .................................................. G06K 9/00
(52) U.S. Cl. ....................... 382/116; 382/124; 382/156; 382/228; 705/44; 340/5.41; 340/5.53; 340/5.83; 902/5
(58) Field of Search ................................ 382/119, 156, 382/157, 115, 116, 155, 159, 160, 186, 187, 224, 226, 228, 137, 138, 135, 124; 235/379, 380, 382, 382.5; 902/2, 3, 24, 5, 25; 705/1, 35, 38, 39, 44; 348/161; 706/15, 20; 340/825.3, 5.2, 5.21, 5.3, 5.4, 5.41, 5.53, 5.6, 5.65, 5.66, 5.74, 5.8, 5.81, 5.83; 380/23–25

(56) References Cited

U.S. PATENT DOCUMENTS

| | | | | |
|---|---|---|---|---|
| 4,385,285 A | * | 5/1983 | Horst et al. | 382/119 |
| 4,724,542 A | * | 2/1988 | Williford | 382/119 |
| 4,993,068 A | * | 2/1991 | Piosenka et al. | 382/116 |
| 5,265,008 A | * | 11/1993 | Benton et al. | 364/408 |
| 5,355,411 A | * | 10/1994 | MacDonald | 380/23 |
| 5,434,928 A | * | 7/1995 | Wagner et al. | 382/187 |
| 5,497,430 A | * | 3/1996 | Sadovnik et al. | 382/156 |
| 5,559,895 A | * | 9/1996 | Lee et al. | 382/119 |
| 5,590,218 A | * | 12/1996 | Ornstein | 382/157 |
| 5,613,012 A | * | 3/1997 | Hoffman et al. | 382/115 |
| 5,615,277 A | * | 3/1997 | Hoffman | 902/3 |
| 5,621,809 A | * | 4/1997 | Bellegarda et al. | 382/116 |
| 5,668,897 A | * | 9/1997 | Stolfo | 382/283 |
| 5,679,940 A | * | 10/1997 | Templeton et al. | 235/380 |
| 5,748,780 A | * | 5/1998 | Stolfo | 382/232 |
| 5,748,783 A | * | 5/1998 | Rhoads | 382/232 |
| 5,754,697 A | * | 5/1998 | Fu et al. | 382/428 |
| 5,764,789 A | * | 6/1998 | Pare, Jr. et al. | 382/115 |
| 5,781,654 A | * | 7/1998 | Carney | 382/137 |
| 5,799,311 A | * | 8/1998 | Agrawal et al. | 382/168 |
| 5,802,199 A | * | 9/1998 | Pare, Jr. et al. | 382/115 |
| 5,819,226 A | * | 10/1998 | Gopinathan et al. | 705/1 |
| 5,898,777 A | * | 4/1999 | Tycksen, Jr. et al. | 380/4 |

OTHER PUBLICATIONS

Therrien, "Decision Estimation and Classification", 1989, pp. 30–35.*

Lippmann, "An Introduction to Computing with Neural Nets", Apr. 1987, pp. 4–22, IEEE ASSP, vol. 4, #2.*

\* cited by examiner

Primary Examiner—Timothy M. Johnson
(74) Attorney, Agent, or Firm—Sierra Patent Group, Ltd.

(57) ABSTRACT

Apparatus for fraud detection for an account includes a plurality of N statistical estimators which estimate the likelihood of a transaction being fraudulent from data about a transaction on the account and transaction history of the account. A statistical estimator is provided which computes an estimate of the likelihood of a particular signature being that of a person authorized to sign on the account from an exemplar of the signature and a history of previous signatures. A combiner produces a combined probability estimate from the plurality of N statistical estimators and the statistical estimator.

11 Claims, 5 Drawing Sheets

IDENTITY VERIFICATION METHODS

BACKGROUND OF THE INVENTION

1. Field of the Invention

The present invention relates to the problem of providing electronic identification. More particularly, the present invention relates to methods for verifying the identity of a purchaser at a remote location for purposes of credit or cash debit transactions.

2. The Prior Art

There are numerous methods known in the prior art for remote verification of identity for various purposes, such as security, credit card transaction verification, automated teller machine transaction verification, etc. Such methods include identification of individual physical characteristics such as fingerprints and retinal patterns, and other indicia such as signature verification.

These prior art methods all attempt, with varying degrees of success, to limit access to cash, credit, to limit physical access to secure areas etc. At present, signature verification systems are not, by themselves, in general use for the purpose of making go/no-go decisions regarding the identity of a signing purchaser. This is in part caused by the fact that the accuracy rates of signature verification are currently too low to be commercially useful. The risk of offending legitimate customers by incorrectly identifying their transactions as fraudulent is too high when balanced against the number of successfully thwarted attempts at fraud resulting from correctly identifying transactions as fraudulent.

Some credit card issuers presently employ a variety of statistical models to detect patterns of suspicious credit card transactions. These statistical models vary widely, but generally examine such factors as the number of transactions, timing of those transactions, geographic locations of the transactions, type of merchant, purchase amounts, card type (e.g., "preferred" vs. "standard" card), historical information about the purchase patterns of individual customers, customer financial status, etc. The value of these statistical analyses is directly related to how quickly from the time at which a credit card is stolen a fraudulent transaction pattern can be identified. The fewer such transactions allowed to occur, the less money the credit card issuer ends up paying to cover them.

BRIEF DESCRIPTION OF THE INVENTION

According to the present invention, a signature verification technique is combined with additional indicia to arrive at a confidence value that a certain transaction is valid.

A method for fraud-pattern detection according to the present invention includes the steps of: providing a multi-layer neural network combiner having N "zero-one" inputs and 1 "zero-one" output; collecting training data for the combiner, including the steps of recording a plurality of signature verification attempts and their associated transactions, keeping track of the transactions which are fraudulent transactions; training the multi-layer neural network combiner on the N "zero-one" inputs and 1 "zero-one" output, wherein the N inputs are used to represent the probabilities output from each of the individual estimators which are to be combined using on-line back propagation with targets of zero for those transactions which turned out to be fraudulent and one for those transactions which turned out to be valid; and evaluating individual transactions, by first generating the individual probabilities, and then combining them by presenting the individual probabilities as inputs to the neural network.

BRIEF DESCRIPTION OF THE DRAWING FIGURES

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The present inventor has determined that, consistently used, signature verification technology can provide additional information to a fraud detection system so that the identification of bogus transactions can be made more quickly. Since some signature verification methods can provide a probabilistic estimate of the likelihood of a given signature being invalid, that information can be combined with other statistical models according to the present invention using a variety of statistical techniques. Signature verification techniques such as, but not limited to, feature-based verification systems like the one described in Hewitt D. Crane & John S. Ostrem, "Automatic Signature Verification Using a Three-Axis Force-Sensitive Pen", IEEE Transactions on Systems, Man and Cybernetics, Vol. SMC-13, No. 3, May/June 1983., p. 329ff (and also in U.S. Pat. No. 4,040,010), are contemplated for use in the present invention. Those of ordinary skill in the art will recognize that other signature verification techniques will function as elements of the present invention.

According to the present invention, signature verification is combined with additional indicia to arrive at a confidence value that a certain transaction is valid. Individual such indicia, each provide a "confidence" value, that is, a probabilistic likelihood estimate that, given the input (for example "signature verification"), the transaction is valid or not. These confidence values are combined according to the present invention.

In the specification and claims herein, the phrase "credit card" is used. This phrase shall be understood to mean a card issued by a credit card issuer, such as, but not limited to Visa or Mastercard, an automated teller machine (ATM) card, or a debit card. The phrase "credit card" shall also be interpreted to mean a "virtual" card, i.e., a financial account which may be accessed by entering an identification number into a suitable terminal and by providing an exemplar of a signature onto a touchpad or other device. A credit card as defined herein may or may not be provided with a means to store information, such as a magnetic or optical strip located on a surface thereof, an imbedded integrated circuit die containing some form of nonvolatile memory and possibly other functional circuitry, or the like.

Two illustrative examples of a system for identity verification according to the present invention are disclosed herein, one in the environment of a credit card transaction and one in the environment of an Internet credit card transaction. Although only these two examples are shown, persons of ordinary skill in the art will readily understand how the system of the present invention is applicable to other sales environments.

Figure 1:
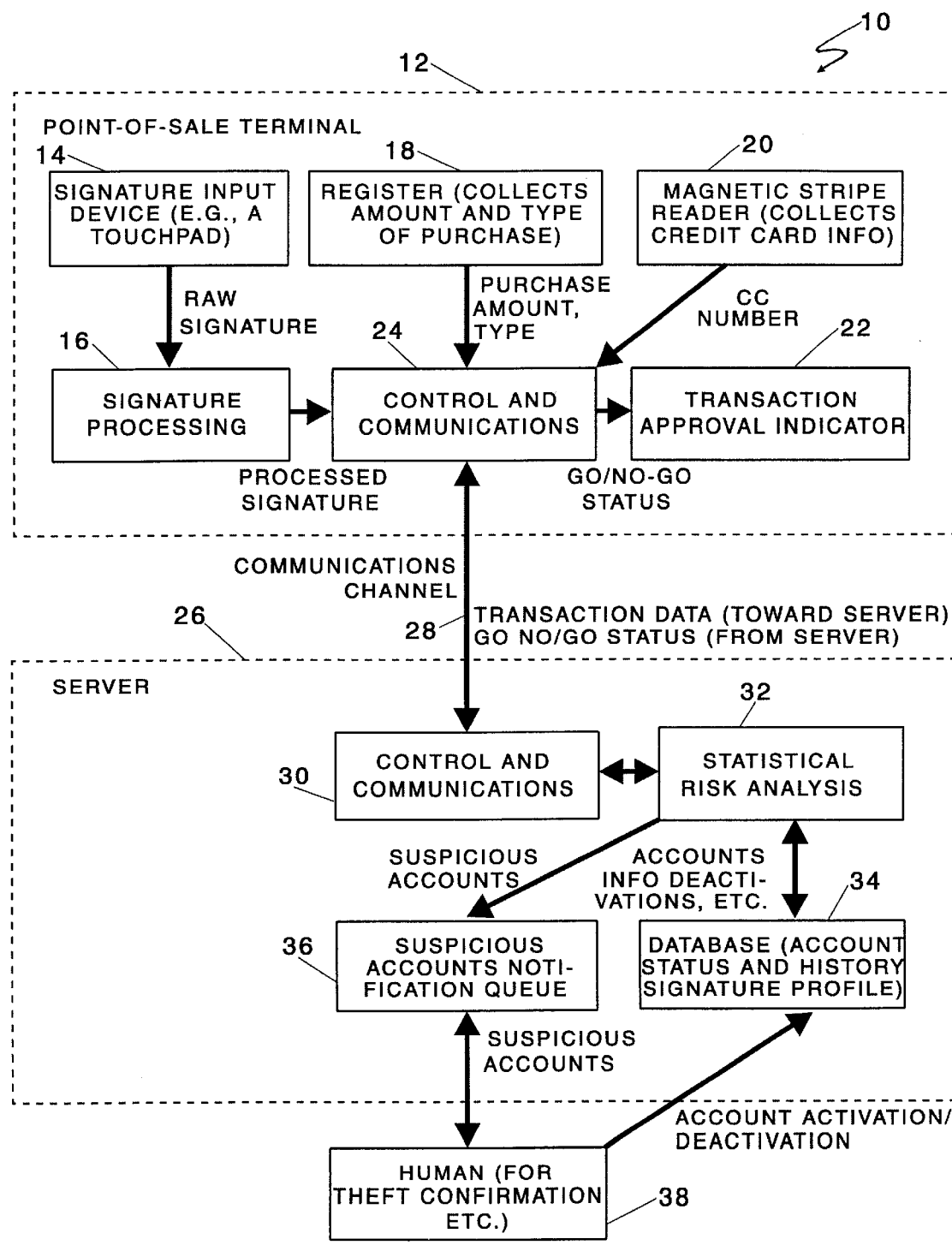
FIG. 1 is a block diagram of a system for identity verification according to the present invention which may be used in credit card transactions.

Referring first to FIG. 1, a block diagram of a system 10 for identity verification according to the present invention which may be used in point-of sale credit card transactions. System 10 includes a point-of-sale terminal 12, usually located on the merchant's premises. Point-of-sale terminal 12 may comprise a PC-type computer or equivalent with a few additional I/O devices. A signature input device 14 comprises a touchpad or similar tablet device and is coupled to a signature processing unit 16. Numerous signature processing systems are available for use in the present invention.

A conventional sales register 18 collects data on the type and amount of purchase. A conventional card reader 20, such as a magnetic stripe reader collects information from the customer's credit card. A transaction approval indicator 22 reports back to point-of-sale terminal 12 the result of the process performed by the present invention.

A signature input device 14, sales register 18 and card reader 20 are coupled to control and communications unit 24, which may comprise, for example, the processor of the PC and a modem.

Point-of-sale terminal 12 communicates with a server 26 via communications channel 28. Communications channel 28 may be a conventional telephone channel or other known communications link. Server 26 includes a control and communications unit 30 which, like its counterpart in point-of-sale terminal 12, may comprise a processor and modem. Information from point-of-sale terminal 12 is presented to statistical risk analysis unit 32, to be described further herein. Database 34 provides historical information to statistical risk analysis unit 32 as described herein.

Statistical risk analysis unit 32 reports its results to the database, to the point-of- sale terminal, and to a suspicious accounts queue 36. A human interface 38 may be employed to confirm results and make a decision to update the database 34 as required.

Figure 2:
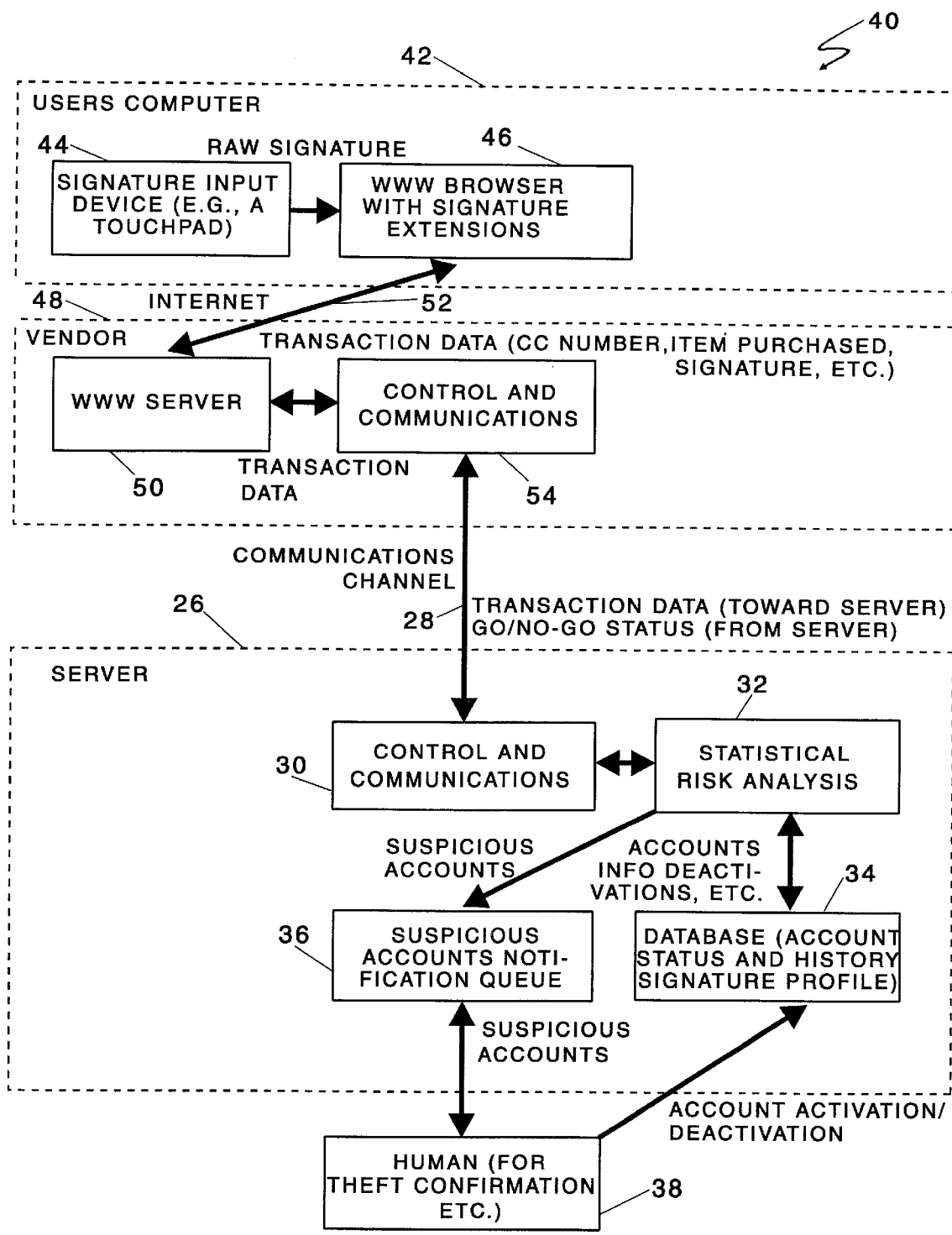
FIG. 2 is a block diagram of a system for identity verification according to the present invention which may be used in Internet credit card transactions.

FIG. 2 is a block diagram of a system 40 for identity verification according to the present invention which may be used in Internet or other network credit card transactions. At the user end, a computer 42 is equipped with a signature input device 44 and suitable driver software, as well as with software 46 to communicate over, for example, the worldwide web. Software 46 is equipped with signature extensions, which may comprise, for example, a signature capture application.

User's computer 42 communicates with a vendor 48 at a web server 50 across Internet link 52. Control and communications unit 54, which may comprise, for example, a processor and a modem communicates with the web server 50 and a server. The server in this embodiment may be the same as the server 26 of FIG. 1, and its component parts are given the same reference numerals as their counterparts in FIG. 1.

Figure 3:
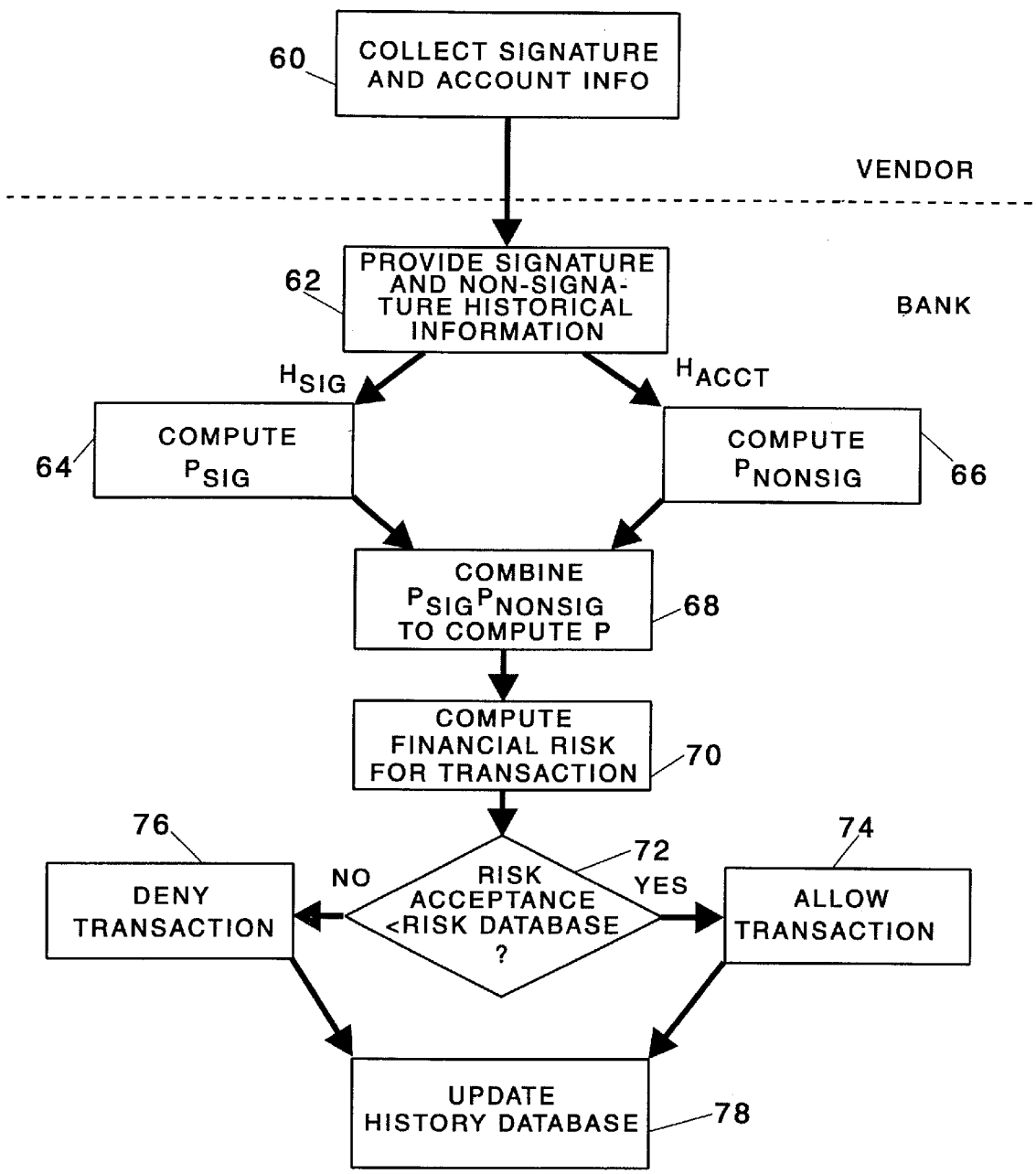
FIG. 3 is a flow diagram of a presently preferred embodiment of an identity verification method according to the present invention.

FIG. 3, to which attention is now drawn, is a flow diagram of a presently preferred embodiment of an identity verification method according to the present invention.

Figure 4:
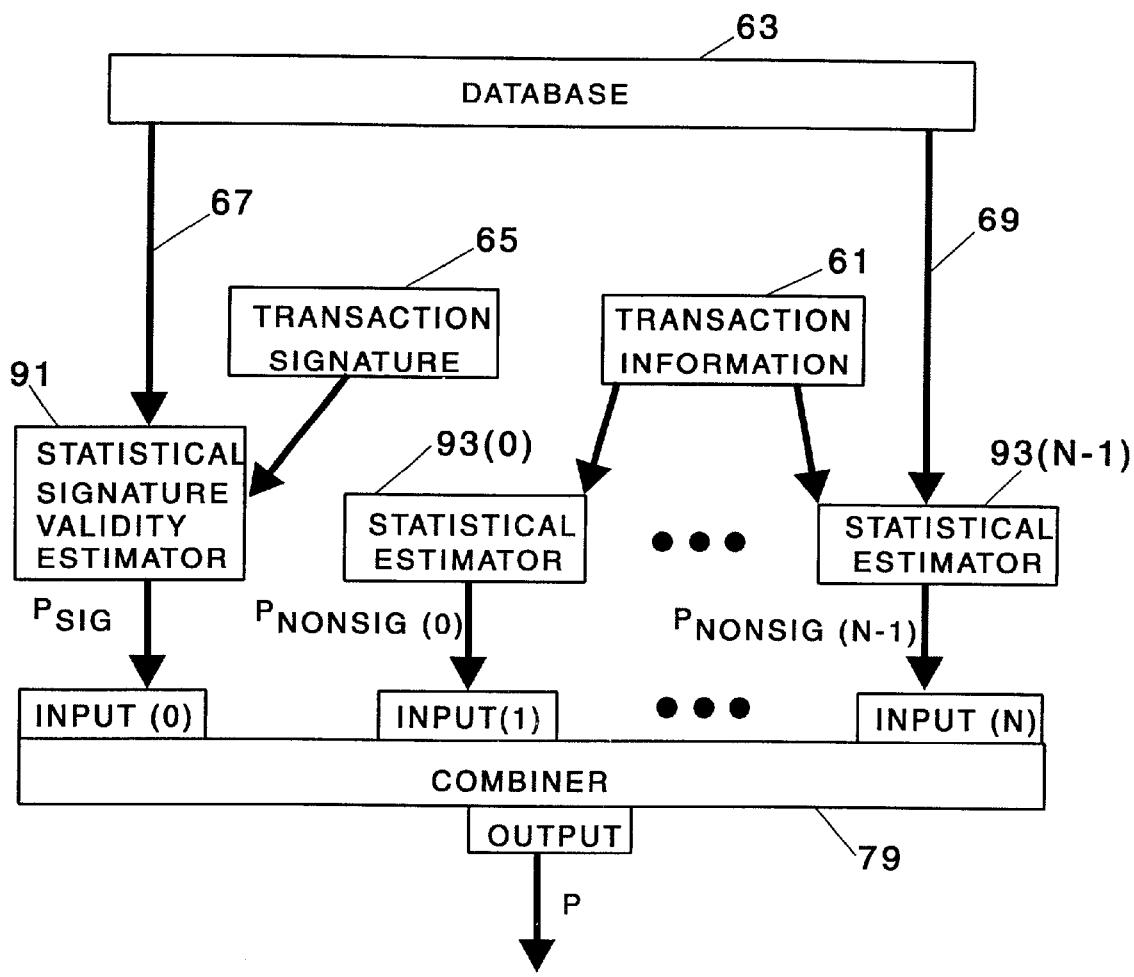
FIG. 4 is a block diagram of an apparatus for fraud detection in accordance with a presently preferred embodiment of the present invention.

FIG. 4 is a block diagram of an apparatus for fraud detection in accordance with a presently preferred embodiment of the present invention. First, at step 60, the signature 65 and other transaction input information 61, such as account number, transaction type and amount, are collected and transmitted for processing. This step is performed at the point-of-sale location, or at the user's location in the case of an Internet transaction.

At the server location, step 62 provides both signature and non-signature historical information about the account from a history database 63 to be compared with the incoming information from the pending transaction. At step 64 the signature information 65 from the impending transaction is then processed along with historical signature information 67 obtained from the database as a result of step 62 to compute Psig. At step 66, the non-signature information 61 is processed along with historical non-signature account information 69, also obtained from the database 63 as a result of step 62 to compute Pnon-sig. The processes of both steps 64 and 66 include updating the history database 63.

At step 68 Psig and Pnon-sig are combined to yield P, and P is evaluated at step 70 to compute the financial risk of the transaction. At step 72, it is determined whether the risk of accepting the transaction is less than the risk of denying the transaction. If the risk of accepting the transaction is less than the risk of denying the transaction, then the transaction is allowed at step 74. If the risk of accepting the transaction is greater than the risk of denying the transaction, then the transaction is denied at step 74. After completion of either of steps 72 or 74, the history database is updated at step 78.

The method of the present invention operates according to the known statistical problem of regression. If it is assumed that the probability estimates are independent, then there are pretty straightforward techniques for computing a best guess by Bayesian analysis. Those techniques are well known in the literature. However, typically those probability estimates will not be completely independent, so regression methods that better handle correlated inputs are preferred.

One technique according to the present invention is to employ a neural network. A neural network is a parameterized network of a specific form which is "trained" to produce a particular output, typically by what is known in neural network literature as "back-propagation" and by what is known in statistical literature as "stochastic gradient descent". The particulars of the training techniques are not critical to the system of the present invention. These techniques are well known in the literature.

Another type of technique which is contemplated according to the present invention is that of regression trees, such as CART. CART and techniques like it build a "tree of decisions" based on simple tests on the input, and at the each leaf of the tree store an estimate of the resulting probabilities. These techniques are well known in the literature.

Partially because there are a very limited number of inputs and outputs to this system, and partially because there would be in such a system a wealth of data to help derive a combining method, it is believed that the precise method of combining is not critical to the system of the present invention.

There are, therefore, several ways according to the present invention to combine the probability estimates generated by the signature verification with the estimates generated by other methods to get an overall probability estimate.

Figure 5:
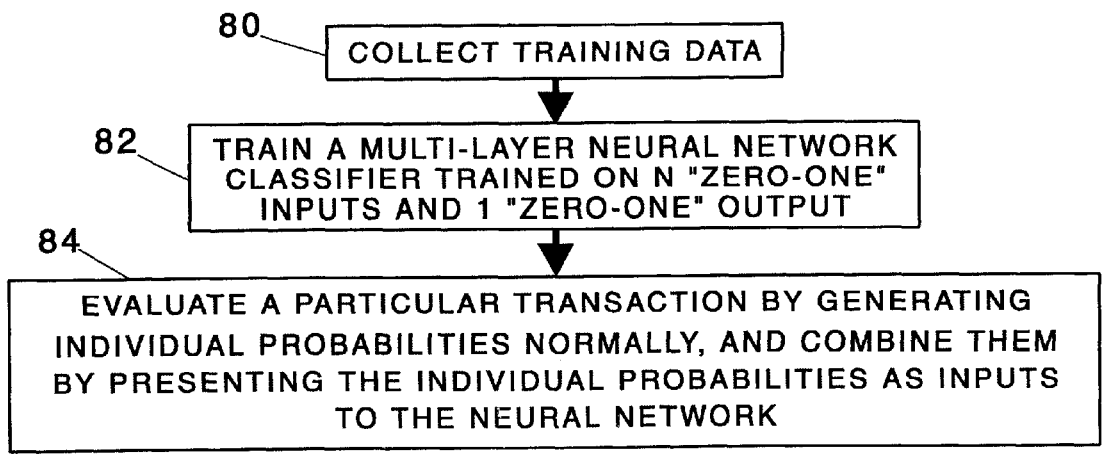
FIG. 5 is a process flow diagram of a method for fraud-pattern detection in accordance with a presently preferred embodiment of the present invention.

According to a presently preferred embodiment of the invention, a neural network combiners 79, is created, as shown is FIG. 5 at reference 80 training data is collected. A plurality of signature verification attempts and their associated transactions are recorded. Track is kept of the transactions which ended up being "false" transactions. At reference 82 a multi-layer neural network classifier is trained on N "zero-one" inputs and 1 "zero-one"0 output. The N inputs are used to represent the probabilities output from each of the individual estimators which are to be combined such as statistical signature validity estimator 91 and statistical estimators 93(0) through 93(N-1), as shown in FIG. 4. Using on-line back propagation, the neural network classifier is trained with "targets" of zero for those transactions which turned out to be falsified and one for those transactions which turned out to be valid. The back propagation algorithm for multilayer neural networks is very well known and is described in the book "Introduction to the Theory of Neural Computation", J. Hertz, A. Krogh, and R. G. Palmer, Addison Wesley, 1991, Chapters 5–7.

At reference number 84, a particular transaction, is evaluated by generating the individual probabilities normally, and combining them by presenting the individual probabilities as inputs to the neural network. Those of ordinary skill in the art will appreciate that the confidences output by signature verification systems such as the one described in Crane and Ostrem supra, can easily be converted into probabilities.

Another method which would work well for the present invention would be to use CART-based regression trees. First, training data is collected and track is kept of the transactions which turned out to be fraudulent as in the first and second steps of the neural network method disclosed above. Next, a regression tree is formed using CART techniques. The algorithm to construct such a tree is well-known in the art, and is described in detail in "Classification and Regression Trees" by Breiman, Friedman, Olshen and Stone, Wadsworth, 1984, Chapter 8.

The generated regression tree is a tree of decisions based on the inputs. For example, the first node of the tree might be a decision which asks if the signature verification estimator 91 (see FIG. 4) generated an estimate of 90% or more. If it did, processing would continue down to the left subtree of that node, otherwise, processing would continue down the right subtree. At each node is another decision, until a "leaf", or "terminal" node is reached.

CART assigns to each leaf node a function, which when applied to the input individual probability estimates, computes an output global probability estimate for those inputs.

The network is evaluated by running through the tree from the root of the tree choosing which direction to travel based on the decision at each node (which are based on the individual probability estimates). When a terminal node is reached, the function CART assigns to terminal nodes is applied to the individual probability estimates, and the resulting value is used as the global probability estimate.

Variance based weighting may also be applied according to the present invention. First, data is collected as in the first step of the neural network method. However, unlike that method, no determination is made of whether the training data transactions are valid or invalid. Instead, for each individual predictor P(i) the variance of the output of that predictor over the sample training data is computed. Let S(i) denote the set of the outputs of predictor i over all the training data.

A weighted arithmetic mean is then constructed where the weightings of each of the individual terms (h(i) is used to denote the weighting of individual estimator number i) as $h(i) = 1/\text{variance}(S(i))$ Those weights are used in the following equation to evaluate new transactions.

$$P = \frac{1}{T} \sum_{i=0}^{N-1} h_i p_i$$

where $$T = \sum_{i=0}^{N-1} h_i$$

where T is the sum of h(i) over all i, and P is the output probability estimate.

This method requires collecting sample data like the first two methods but does not require waiting to determine the outcome (probably a several month wait) to determine the validity of each of the samples before it can be used.

As with existing verification systems, a credit card could be invalidated and the customer notified by phone. Alternatively, in other situations, a credit card issuer might elect to attempt to contact the customer without disabling the credit card. In other situations, the credit card issuer might request that the retailer ask the customer for another signature.

The system of the present invention avoids some of the pitfalls of prior-art methods which use only signature verification to allow or disallow a transaction. For example, it is known that a person's signature tends to slowly change over time. The amount of time since the last transaction could be used to adjust the estimated probability that a particular signature is invalid.

Additional allowance for changes in a signature may be made for customers who have not recently used their credit cards. Moreover, since the server can keep signature data from these newer transactions it can update its model of the customer signature over time.

Conversely, the other fraud-detection techniques can be used to identify signatures that are very likely to be valid. This feature of the present invention allows the signature verification system to update itself only on signatures that are believed to be valid for other reasons.

In the method disclosed so far herein, the customer and the vendor are located in the same place. It is also contemplated according to the present invention that the customer and the vendor could be separated. In that case, the vendor would collect a signature from the customer and relay the signature via any sort of electronic communication channel (phone lines, the Internet, private networks of a variety of types, satellite links, "cable modem" links, etc.). Similarly, the particular protocol used to transmit the data could take any of a number of forms obvious to those skilled in the art.

To provide a complete example: a computer user, browsing the World Wide Web, could collect a signature using an input device and a signature-aware browser. That browser could communicate signatures (using encryption, perhaps) over the Internet to the vendor. This would provide a nice mechanism for improving the security of Internet-based transactions, and it could work as part of the rest of the system we've described.

In the disclosed herein, it is necessary to transmit signatures (or features derived from those signatures) over the communication channel. However, if network bandwidth is very expensive, and if the signature verification systems user model is sufficiently compact, it would be possible to perform signature verification at the vendor, and to simply transfer a probability estimate to the credit card issuer.

The method of the present invention may be illustrated by an example. In the illustrative example given herein, arbitrary choices are made which could be much different from choices made in a working system according to the present invention.

A customer walks into a stereo store and buys three thousand dollars worth of stereo equipment. The store rings up the transaction, swipes a credit card to enter its account information into the register, and gets a signature from the customer using some sort of signature capture device.

The store transmits the following information to the credit card issuer. From its own knowledge, it transmits the purchase price ($3,000), the time and date of the transaction, whether the sale is a local sale (customer on premises), or via telephone, the location of the store (e.g., a zip code or city), and the type of items purchased (stereo equipment). From the signature capture apparatus, the store transmits either the raw signature information (strokes with timing and pressure information) or the probability estimate of validity generated in the store as previously disclosed. From the credit card, the store transmits the account number. The credit card issuer looks up additional information in its possession based on the account number taken from the card, the credit card expiration date, the credit balance of the account, the credit limit and/or amount remaining to limit ($3,200 left on card), information from credit agencies as to current financial status of the cardholder, the residence location of the cardholder, personal data on cardholder (age, gender, race, birthplace, marital status, astrological sign, occupation, income, etc.), and a history of all of this for that customer for all transactions within a selected past time period, perhaps all transactions which have taken place in the last couple of years.

What happens next at the credit card issuer can be divided into three steps. A probability of the transaction being correct from the non-signature information is computed. A probability of the transaction being valid from the signature data is computed. Then the results of the previous steps are into a single probability estimate. These steps are discussed each in turn.

In the illustrative example herein, the non-signature data portions of the transaction are encoded to be suitable for input into a neural network, and then are evaluated in the neural network. That neural network will produce a probability estimate.

The purchase price is encoded on 10 neurons, each representing a range of purchase prices. For a particular transaction, exactly one of the 10 neurons will be "on" (e.g., have a value of 1), the other nine will be 'off' (e.g., have a value of 0.) Exemplary ranges are: $0–$10; $10–$20; $20–$40; $40–$80; $80–$160; $160–$320: $320–$500; $500–$1000; $1K–$2K; $2K–$5K; >$5K.

Another 10 neurons can be used to encode the account balance using the same encoding.

Time and date information, as well as history information, are considered in order to determine the number of transactions in the last 24 hours. These are encoded onto 5 neurons (of which exactly one will be on in any case): 0–1 other transactions besides this in the past 24 hours; 2–4 other transactions besides this in the past 24 hours; 5–10 other transactions besides this in the past 24 hours; 11–20 other transactions besides this in the past 24 hours; >20 other transactions besides this in the past 24 hours.

Remote sales are distinguished from "customer present" sales by a single neuron which is on if the customer is present and off otherwise.

The location of the store is used to determine another set of inputs which represent the frequency of false transactions historically in that zip code. For any transaction, one of 5 neurons is on, the others are off: no information available on that zip code; one of the bottom quartile "most dangerous" zip codes; one of the next quartile "most dangerous" zip codes; one of the third quartile "most dangerous" zip codes; one of the top quartile "most dangerous" zip codes.

Given an encoding like this, and a historical record of transactions, the information necessary to encode those transactions, and data about whether the transactions proved through time to be invalid (e.g., the credit card issuer had to make good a fraudulent), training of a neural network proceeds with techniques well-known in the art, using a multilayer neural network trained with stochastic gradient descent (a.k.a. back propagation) with momentum as described in "Introduction to the Theory of Neural Computation".

That network is trained to produce an output of 1 on the "fraudulent" transactions and 0 otherwise. It is known in the art that the output of such a neural network on new cases (e.g., not the cases used to train the neural network) can be used as a probability. This probability is the output of the first step.

A signature verification system is used to construct another probability estimate. Methods such as disclosed in Crane & S. Ostrem, supra, may be used to construct this probability estimate.

Over the training data, the variance of probability estimates of the non-signature estimator is computed, and the variance of the probability estimates of the signature estimator are computed. Computing such variance is well known to those of ordinary skill in the art.

The combined probability is then estimated via:

$$\log P = \frac{v_{non\text{-}sig} \log P_{non\text{-}sig} + v_{sig} \log P_{sig}}{v_{non\text{-}sig} + v_{sig}}$$

where the quantity v(sig) is the variance of signature verification probability estimates and the quantity v(non-sig) is the variance of non-signature verification probability estimates.

After the probabilities have been combined, the credit card issuer then uses some evaluation of the cost of accepting (given this final probability estimate) vs. the cost of denying credit. For example, it is assumed that the system determines a final 30% probability of this being a legitimate transaction (a 70% probability of the transaction being fraudulent). At this point, the credit card issuer compares the total cost of accepting the transaction (the chance that it's fraudulent times the cost, or in this case, 0.70×$3,000= $2100.00). The credit card issuer then compares this cost with the cost of denying the transaction: $50 to notify the customer card has been revoked, plus the cost of the danger that the customer will be displeased enough to close the account. The latter risk may be estimated as the probability that transaction was really valid (30%) multiplied by a 50% chance of the customer canceling card because he or she was improperly denied credit multiplied by the estimated profit on the card for the lifetime of the card in current dollars (assumed for this example to be $9,000.00). This comes out to $1350.00 (0.3×0.5×$9,000.00), or $1400.00 including the cost of notification.

The risk-weighted cost of accepting the transaction is $2100.00. The risk-weighted cost of denying the transaction is $1400.00. The credit card issuer decides to deny the transaction, marks the credit card as invalid in it's database, sends a message to a human at the credit card issuer to contact the card holder, and sends a signal to the merchant denying the transaction. (These numbers and estimates are not necessarily representative of real transactions.)

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for fraud detection for an account on the event of a transaction attempted on the account, comprising:
    an electronic signature capture device operatively coupled to a signature processing system;
    a data collection device;
    a database operatively coupled to said signature capture device and said data collection device;
    a plurality of statistical estimators operatively coupled to said database which estimate the likelihood of a transaction being fraudulent;
    a statistical signature validity estimator operatively coupled to said database which computes the likelihood of a particular signature from said signature processing system being that of a person authorized to sign on the account from an exemplar of said particular signature and a history of previous signatures, said statistical validity estimator performing estimation independently of said plurality of statistical estimators; and
    a combiner for producing a combined probability estimate from said plurality of statistical estimators and said statistical signature validity estimator.

2. The apparatus of claim 1 wherein said combiner is a neural network.

3. The apparatus of claim 1 wherein said combiner is a tree-based regressor.

4. The apparatus of claim 1 wherein said history of previous signatures have a probability of having been made by a person other than said person authorized to sign on the account which is less than some threshold probability.

5. The apparatus of claim 1 wherein said account is a credit card account which an authorized user is provided with a physical card capable of storing information and wherein information representing said history of previous signatures is stored thereon and wherein said statistical signature validity estimator is located at a location where a person is attempting said transaction.

6. The apparatus of claim 1, wherein said plurality of statistical estimators and said statistical signature validity estimator are selectively updateable.

7. A method for fraud detection for a transaction attempted on an account including the steps of:
    providing a plurality of statistical estimators which estimates the likelihood of the transaction being fraudulent from data about a transaction on the account and transaction history of the account;
    providing said plurality of statistical estimators with data about a transaction on the account and transaction history of the account;
    providing computer data representing a signature from an electronic signature capture device:
    providing a selectively updateable statistical estimator which computes an estimate of the likelihood of a particular signature being that of a person authorized to sign on the account from an exemplar of the signature and the history of previous signatures, said statistical estimator performing estimation independently of said plurality of statistical estimators;.
    providing said statistical estimator with data comprising an exemplar of the signature and a history of previous signatures; and
    producing a combined probability estimate from the plurality of statistical estimators and the statistical estimator.

8. The method of claim 6, further comprising generating a cost of accepting the transaction by weighing said combined probability estimate against a cost of denying said transaction.

9. A method for fraud-pattern detection, including the steps of:
    providing a multi-layer neural network combiner having N "zero-one" inputs and one "zero-one" output:
    collecting training data for said combiner, including the steps of recording a plurality of signature verification attempts and their associated transaction, and keeping track of the transactions which are fraudulent transactions;
    training said multi-layer neural network combiner on said N "zero-one" inputs and one "zero-one" output, wherein the N inputs are used to represent the probabilities output from each of the individual estimators which are to be combined using on-line backpropagation with targets of zero for those transactions which turned out to be fraudulent and one for those transactions which turned out to be valid; and
    evaluating individual transactions, by first generating the individual probabilities, and combining them by presenting the individual probabilities as inputs to the neural network.

10. A method for fraud detection in an electronic transaction by a purchaser, including the steps of:
    providing at a buyer's computer an account number for a particular credit card account;
    creating at said buyers computer data representing a signature from an electronic signature capture device;
    transmitting said account number and said data representing a signature from said buyer to a seller over a computer network;
    transmitting said account number and said data representing a signature from said seller to a credit card issuer over a computer network;
    providing said credit card issuer a plurality of statistical estimators which estimate the likelihood of the transaction being fraudulent from data about a transaction on the account and transaction history of the account;
    providing said credit card issuer a statistical estimator which computes an estimate of the likelihood of a particular signature being that of a person authorized to sign on the account from an exemplar of the signature and a history of previous signatures, said statistical estimator performing estimation independently of said plurality of statistical estimators;
    providing said credit card issuer said statistical estimator with data comprising an exemplar of the signature and the history of previous signatures;
    producing at said credit card issuer a combined probability estimate from plurality of statistical estimators and the statistical estimator;
    transmitting an acceptance or non-acceptance of the transaction from said credit card issuer to said seller; and
    providing a database coupled to said credit card issuer and said buyers computer; updating selectively said history of previous signatures within said database; and updating selectively said data within said database.

11. A method for fraud detection in an electronic transaction by a purchaser, including the steps of:

providing at a buyer's computer an account number for a particular credit card account;

providing at said buyer's computer an electronic signature capture device;

creating at said buyers computer, data representing a signature from said electronic signature capture device;

transmitting said account number and said data representing a signature from said seller to a credit card issuer over a computer network;

providing at said credit card issuer a multi-layer neural network combiner having N "zero-one" inputs and one "zero-one" output;

collecting at said credit card issuer within a database, training data for said neural network combiner, including the steps of recording a plurality of signature verification attempts and their-associated transactions, and keeping track of the transactions which are fraudulent transactions;

training at said credit card issuer said multi-layer neural network combiner on said N "zero-one" inputs and one "zero-one" output, wherein the N inputs are used to represent the probabilities output from each of the individual estimators which are to be combined using on-line backpropagation with targets of zero for those transactions which turned out to be fraudulent and one for those transactions which turned out to be valid;

evaluating at said credit card issuer, individual transactions by first generating the individual probabilities, and combining them by presenting the individual probabilities as inputs to the neural network and transmitting an acceptance or non-acceptance of the transaction from said credit card issuer to said seller over a network; and updating said database.

* * * * *